(12) United States Patent
Seidel et al.

(10) Patent No.: US 7,220,790 B2
(45) Date of Patent: May 22, 2007

(54) FLAME-RESISTANT POLYCARBONATE MOLDING COMPOSITIONS

(75) Inventors: Andreas Seidel, Dormagen (DE); Thomas Eckel, Dormagen (DE); Dieter Wittmann, Leverkusen (DE); Dirk Kurzidim, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 130 days.

(21) Appl. No.: 10/627,015

(22) Filed: Jul. 25, 2003

(65) Prior Publication Data

US 2004/0059031 A1   Mar. 25, 2004

(30) Foreign Application Priority Data

Jul. 29, 2002  (DE) ............................... 102 34 420
Nov. 21, 2002  (DE) ............................... 102 54 549

(51) Int. Cl.
  *C08K 5/523*  (2006.01)
(52) U.S. Cl. .................... 524/127; 524/140; 524/141
(58) Field of Classification Search ................ 524/127, 524/140–141; 525/67, 316
See application file for complete search history.

(56) References Cited

U.S. PATENT DOCUMENTS

| | | | | |
|---|---|---|---|---|
| 5,061,745 A | | 10/1991 | Wittmann et al. | .......... 524/139 |
| 5,204,394 A | | 4/1993 | Gosens et al. | .............. 524/125 |
| 5,672,645 A | | 9/1997 | Eckel et al. | ................ 524/127 |
| 5,849,827 A | | 12/1998 | Bödiger et al. | ............. 521/423 |
| 6,117,542 A | * | 9/2000 | Nanba et al. | ................ 428/327 |
| RE36,902 E | | 10/2000 | Eckel et al. | ................. 524/127 |
| 6,355,767 B1 | * | 3/2002 | Takagi | ........................ 528/196 |
| 6,403,683 B1 | | 6/2002 | Kobayashi | .................. 524/115 |
| 6,503,628 B1 | * | 1/2003 | Janarthanan et al. | ........ 428/412 |
| 6,596,794 B1 | | 7/2003 | Eckel et al. | ................. 524/123 |
| 6,596,812 B2 | * | 7/2003 | Toyoshima et al. | ........... 525/67 |
| 6,613,824 B2 | * | 9/2003 | Campbell et al. | ........... 524/127 |
| 2002/0151624 A1 | | 10/2002 | Kobayashi | .................. 524/115 |
| 2002/0165300 A1 | | 11/2002 | Fujiguchi et al. | ........... 524/141 |

FOREIGN PATENT DOCUMENTS

| | | |
|---|---|---|
| EP | 755 977 | 1/1997 |
| EP | 933 396 | 8/1999 |
| EP | 1 142 957 | 10/2001 |
| JP | 11-302523 | 11/1999 |

* cited by examiner

*Primary Examiner*—Peter Szekely
(74) *Attorney, Agent, or Firm*—Joseph C. Gil; Aron Preis

(57) ABSTRACT

A thermoplastic molding composition having good flame resistance, melt flowability, resistance to chemicals and creep is disclosed. The composition contains A) at least one member having weight average molecular weight ($M_w$) of 25,000 to 35,000 g/mol, selected from the group consisting of aromatic polycarbonate and polyestercarbonate B) ABS graft polymer produced by the mass polymerization process and characterized in (i) having a butadiene content of 8 to 15% in relation to the weight of the graft polymer, (ii) having an acrylic acid derivative content of 15 to 30% in relation to the total weight of the acrylic derivative and styrene monomer, and (iii) containing styrene monomer-acrylic acid derivative copolymer having a weight average molecular weight of $5 \cdot 10^4$ to $14 \cdot 10^4$ g/mol. The composition may further contain one or more of halogen-free phosphorus compounds, fluorinated polyolefin, a polymer containing acrylate monomer and an inorganic material in particulate form.

20 Claims, No Drawings

FLAME-RESISTANT POLYCARBONATE MOLDING COMPOSITIONS

FIELD OF THE INVENTION

The invention relates to thermoplastic molding compositions and in particular to impact resistant polycarbonate compositions.

SUMMARY OF THE INVENTION

A thermoplastic molding composition having good flame resistance, melt flowability, resistance to chemicals and creep is disclosed. The composition contains A) at least one member having weight average molecular weight ($M_w$) of 25,000 to 35,000 g/mol, selected from the group consisting of aromatic polycarbonate and polyestercarbonate, B) ABS graft polymer produced by the mass polymerization process and characterized in (i) having a butadiene content of 8 to 15% in relation to the weight of the graft polymer, (ii) having an acrylic acid derivative content of 15 to 30% in relation to the total weight of the acrylic derivative and styrene monomer, and (iii) containing styrene monomer-acrylic acid derivative copolymer having a weight average molecular weight of $5 \cdot 10^4$ to $14 \cdot 10^4$ g/mol. The composition may further contain one or more of halogen-free phosphorus compounds, fluorinated polyolefin, a polymer containing acrylate monomer and an inorganic material in particulate form.

BACKGROUND OF THE INVENTION

Manufacturers are now increasing the requirements for case materials for information technology equipment, such as for example printers, copiers, Notebooks, monitors, mobile phones etc. Many of these require flame-retarding properties. The demand for materials containing halogen-free flame-retardants is met particularly by PC+ABS blends, which have flame-resistance provided by organic phosphoric acid esters. Such compositions have been disclosed is many publications including EP-A 0 345 522, EP-A 0 640 655 and EP 0 363 608. Molded bodies produced from such compositions have a good combination of application properties, such as good toughness, high resistance to thermal stresses and satisfactory processing behavior for many applications, but generally only within a limited processing window.

More recently, the requirements for resistance to chemicals and hydrolysis, and for injection molding behavior and processing stability i.e. the consistency of the characteristics of such molding compositions at high processing temperatures, have increased. These requirements are met by PC/ABS compositions containing organic phosphoric acid esters, in particular oligomeric phosphates, as a flame retardant, which contain an ABS produced by the mass polymerization process as the ABS component. Such compositions have also already been disclosed in patent literature.

Thus EP-A 0 755 977 discloses PC+ABS blends containing ABS of a low rubber content, preferably mass ABS, and a low flame-retardant content. The required melt flowability is achieved in these molding compositions by using polycarbonate with a relatively low molecular weight, most preferably having weight average molecular weights of <25,000 g/mol, which restricts the stress cracking resistance. A combination of stress cracking resistance and flame-resistance that is sufficient for many, but not all, applications is obtained only by restricting the content of flame-retardant and rubber. The current increased requirements for melt flowability, flame-resistance and stress cracking resistance are no longer met by such compositions. Although the stress cracking resistance is improved by the use of higher-molecular polycarbonate, the melt flowability is reduced still further. Using higher quantities of flame retardant meets the flowability requirements but results in a reduction in resistance to chemicals.

EP-A 0 933 396 discloses polycarbonate mixtures containing mass ABS and oligophosphate flame retardants characterized by good notched impact resistance, resistance to hydrolysis and improved processing stability. However, the molding compositions disclosed in this application have in particular inadequate flame-resistance and weld line strength for many applications.

JP-A 11 302 523 discloses compositions of polycarbonate, mass ABS, emulsion ABS and an acrylonitrile-vinyl copolymer, which contain monophosphate and polytetrafluoroethylene (PTFE) flame-retardants. These molding compositions have an inadequate processing window, as they have a tendency to phase agglomeration at higher processing temperatures, which impairs the mechanical properties, and bleeds out the flame-retarding additive. Furthermore, experience shows that such compositions have inadequate resistance to hydrolysis.

DE 198 53 105 A1 discloses compositions containing polycarbonate, mass ABS, which is preferably used in combination with emulsion ABS, and phosphoric acid esters. These molding compositions have, in particular, inadequate flowability, resistance to chemicals and to hydrolysis and poor creep behavior.

EP-A 1 026 205 discloses molding compositions of polycarbonate, ABS graft polymers, preferably produced by the mass polymerization process, monomeric or oligomeric phosphoric acid esters and silicate reinforcing materials, which are characterized in that the chlorine content of the composition is no greater than 100 ppm. Compositions containing acrylate-based graft polymers with a core/shell structure as a further component are also disclosed. The molding compositions thus disclosed are characterized by excellent resistance to hydrolysis, but generally exhibit poor resistance to chemicals and inadequate creep behavior as a result of the low molecular weight of the polycarbonate used. However, the low molecular weight is necessary to achieve sufficient melt flowability. With the mass ABS used in these compositions it is impossible to achieve an adequate flowability level using higher-molecular polycarbonate. The same applies also to the molding compositions disclosed in WO 00/39210, which are characterized in that they contain a bisphenol A-bridged oligophosphate with a low acid value as the flame-retarding additive.

U.S. Pat. No. 5,849,827 discloses flame-resistant compositions containing polycarbonate and emulsion ABS, which, in addition to conventional flame-retarding additives, contain very fine inorganic particles and are characterized by improved flame resistance. Positive effects of the particles on the melt flowability and resistance to hydrolysis of the molding compositions are not disclosed in this application.

The object of the present invention was to provide polycarbonate compositions, which are characterized in particular by a combination of excellent stress cracking resistance and creep resistance with improved melt flowability and which also have a high degree of toughness, processing stability and resistance to hydrolysis. In particular, the object of the invention was to provide flame-resistant compositions from which molded articles may be produced, which pass the UL94V test at 1.5 mm wall thickness with a V–0 rating and in which the flame-retarding additive does not bleed out significantly under the conventional processing conditions.

DETAILED DESCRIPTION OF THE INVENTION

It was found that compositions containing polycarbonate of medium molecular weight, a special ABS graft polymer produced by mass polymerization processes, and optionally other component selected from oligomeric organic phosphoric acid esters, very fine inorganic particles, acrylate-containing polymers and fluorinated polyolefins, have the desired characteristics.

The present invention thus provides compositions containing

A) 40 to 95 parts by weight, preferably 50 to 80 parts by weight, in particular 60 to 80 parts by weight of aromatic polycarbonate or polyestercarbonate or mixtures of these with a weight average molecular weight ($M_w$) of 25,000 to 35,000, preferably 26,000 to 33,000, in particular 26,000 to 31,000 g/mol, B) 5 to 40 parts by weight, preferably 7 to 30 parts by weight, in particular 10 to 20 parts by weight of an ABS graft polymer produced by the mass polymerization process from at least one of acrylonitrile and methacrylonitrile further butadiene and at least one styrene monomer, the butadiene content being 8 to 15 wt. %, preferably 10 to 15 wt. %, in particular 11 to 14 wt. % in relation to the weight of the graft polymer and the content of that (meth)acrylonitrile being 15 to 30 wt. %, preferably 18 to 27 wt. %, in particular 21 to 26 wt. % in relation to the total weight of the and styrene monomer in the graft polymer, the graft polymer containing styrene-(meth) acrylonitrile copolymer with a weight average molecular weight ($M_w$) of 50,000 to 140,000, preferably of 60,000 to 130,000, in particular of 60,000 to 110,000 g/mol, C) 0 to 20 parts by weight, preferably 2 to 18 parts by weight, in particular 8 to 16 parts by weight of a halogen-free phosphorus compound, preferably an oligomeric organic phosphoric acid ester, in particular one based on bisphenol-A or its derivatives, D) 0 to 1 parts by weight, preferably 0.1 to 0.5 parts by weight, in particular 0.2 to 0.5 parts by weight of a fluorinated polyolefin, which is preferably incorporated in the form of a master batch, a pre-compound or a co-precipitate of PTFE and a polymer derived from at least one vinyl monomer, E) 0 to 5 parts by weight, preferably 0.1 to 3 parts by weight, in particular 0.5 to 2 parts by weight of a polymer of at least one acrylate monomer, preferably a graft polymer of 10–90 wt. %, preferably 30–80 wt. %, in particular 50–80 wt. % in relation to the graft polymer of a polymer in particle form, the polymer having a glass transition temperature below 0° C., preferably below -20° C., in particular below -40° C. as a grafting base and 90 to 10 wt. %, preferably 70 to 20 wt. %, in particular 50 to 20 wt. % in relation to the graft polymer of a grafting shell of vinyl monomers, containing at least 40 wt. %, in relation to the grafting shell, preferably at least 60 wt. %, in particular at least 80 wt. % of acrylate monomers, the preferred grafting base selected from the group consisting of polybutadiene, silicon and silicon-acrylate rubber, F) 0 to 3 parts by weight, preferably 0.1 to 2 parts by weight, in particular 0.2 to 1.5 parts by weight of an inorganic material in particulate form having a maximum average particle diameter of no more than 1000 nm, preferably no more than 500 nm, in particular no more than 200 nm and G) up to 10 parts by weight, preferably up to 5 parts by weight, in particular up to 2 parts by weight of conventional additives recognized in the art of polycarbonate compositions for their utility.

The sum of the parts by weight of all components is 100.

The components of the compositions according to the invention are explained in more detail below.

Component A

Suitable aromatic polycarbonates and/or aromatic polyestercarbonates according to Component A of the invention are known from the literature or may be produced by processes known from the literature (for the production of aromatic polycarbonates see for example Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; for the production of aromatic polyestercarbonates e.g. DE-OS 3 077 934).

Aromatic polycarbonates are produced e.g. by the melt process or by reaction of diphenols with carbonic acid halides, preferably phosgene and/or with aromatic dicarboxylic acid dihalides, preferably benzene dicarboxylic acid dihalides, by the phase interface process, optionally using chain stoppers, for example monophenols and optionally using trifunctional or more than trifunctional branching agents, for example triphenols or tetraphenols.

Diphenols for the production of the aromatic polycarbonates and/or aromatic polyestercarbonates are preferably those of the formula (I)

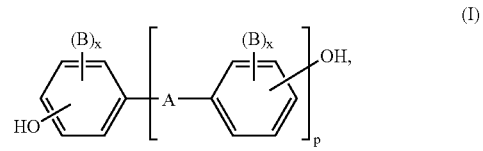

(I)

wherein

A is a single bond, $C_1$–$C_5$-alkylene, $C_2$–$C_5$-alkylidene, $C_5$–$C_6$-cycloalkylidene, —O—, —SO—, —CO—, —S—, —SO_2—, $C_6$–$C_{12}$-arylene, onto which further aromatic rings, optionally containing heteroatoms, may be condensed, or a group of the formula (II) or (III)

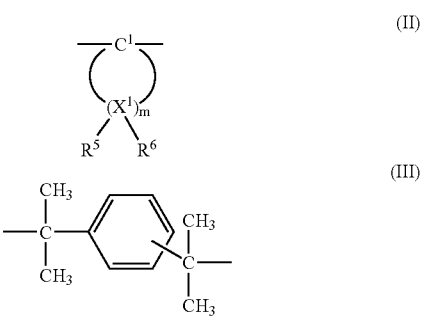

B is, in each case, $C_1$–$C_{12}$-alkyl, preferably methyl, halogen, preferably chlorine and/or bromine x in each case, independently of each other, is 0, 1 or 2, p is 1 or 0, and $R^5$ and $R^6$ may be selected individually for each $X^1$, independently of each other, as hydrogen or $C_1$–$C_6$-alkyl, preferably hydrogen, methyl or ethyl, $X^1$ is carbon and m is an integer from 4 to 7, preferably 4 or 5, provided that $R^5$ and $R^6$ are both alkyl on at least one $X^1$ atom.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropyl-benzenes and their ring-brominated and/or ring-chlorinated derivatives.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethyl cyclohexane, 4,4'-dihydroxydiphenyl sulfide, 4,4'-dihydroxydiphenyl-sulfone and their di- and tetrabrominated or chlorinated derivatives such as for example 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-bis-(4-hydroxyphenyl)-propane (bisphenol A) is preferred in particular.

The diphenols may be used individually, or in any mixture.

The diphenols are known from the literature or may be obtained by processes known from the literature.

Suitable chain stoppers for the production of the thermoplastic, aromatic polycarbonates are for example phenol, p-chlorophenol, p-tert.-butyl phenol or 2,4,6-tribromophenol, but also long chain alkyl phenols such as 4-(1,3-tetramethylbutyl)-phenol according to DE-OS 2 842 005 or monoalkylphenol or dialkyl phenols containing a total of 8 to 20 C atoms in the alkyl substituents such as 3,5-di-tert.-butyl phenol, p-iso-octyl phenol, p-tert. octyl phenol, p-dodecyl phenol and 2-(3,5-dimethylheptyl)-phenol and 4-(3,5-dimethylheptyl)-phenol. The quantity of chain stoppers to be used is generally 0.5 mol. % to 10 mol. %, in relation to the molar sum of the diphenols used in each case.

The thermoplastic, aromatic polycarbonates may be branched in the known way, and preferably by incorporating 0.05 to 2.0 mol. % in relation to the sum of the diphenols used, of trifunctional or more than trifunctional compounds, for example those having three or more phenolic groups.

Both homopolycarbonates and copolycarbonates are suitable. 1 to 25 wt. %, preferably 2.5 to 25 wt. % (in relation to the total quantity of diphenols to be used) of polydiorganosiloxanes with hydroxy-aryloxy terminal groups may also be used for the production of copolycarbonates according to Component A of the invention. These are known (see for example U.S. Pat. No. 3,419,634) or may be produced by processes known from the literature. The production of copolycarbonates containing polydiorganosiloxanes is described e.g. in DE-A 3 334 782.

Preferred polycarbonates in addition to the bisphenol A homopolycarbonates are the copolycarbonates of bisphenol A containing up to 15 mol. % in relation to the molar sum of diphenols, of other diphenols mentioned as preferred or particularly preferred, in particular 2,2-bis(3,5-dibromo-4-hydroxyphenyl)-propane.

Aromatic dicarboxylic acid dihalides for the production of aromatic polyestercarbonates are preferably the diacid dichlorides of isophthalic acid, terephthalic acid, diphenylether-4,4'-dicarboxylic acid and naphthaline-2,6-dicarboxylic acid.

Mixtures of diacid dichlorides of isophthalic acid and terephthalic acid in a ratio of 1:20 to 20:1 are preferred in particular.

When producing polyestercarbonates, a carbonic acid halide, preferably phosgene, is also used as a bifunctional acid derivative.

In addition to the monophenols already mentioned, their chlorocarbonic acid esters and the acid chlorides of aromatic monocarboxylic acids, which may optionally be substituted by $C_1$–$C_{22}$-alkyl groups or by halogen atoms, as well as aliphatic $C_2$–$C_{22}$ monocarboxylic acid chlorides are also possible chain stoppers for the production of the aromatic polyestercarbonates.

The quantity of chain stoppers is 0.1 to 10 mol. % in each case, in relation to mols of diphenols in the case of the phenolic chain stoppers, and to mols of dicarboxylic acid dichlorides in the case of the monocarboxylic acid chain stopper.

The aromatic polyestercarbonates may also have aromatic hydroxycarboxylic acids incorporated in them.

The aromatic polyestercarbonates may be either linear or branched in the known way (see also DE-A 2 940 024 and DE-A 3 007 934).

3- or polyfunctional carboxylic acid chlorides, such as trimesic acid trichloride, cyanuric acid trichloride, 3,3'-,4,4'-benzophenone-tetracarboxylic acid tetrachloride, 1,4,5,8-naphthaline tetracarboxylic acid tetrachloride or pyromellitic acid tetrachloride, in quantities of 0.01 to 1.0 mol. % (in relation to the dicarboxylic acid dichlorides used) or 3- or polyfunctional phenols, such as phloroglucinol, 4,6-dimethyl-2,4,6-tri-(4-hydroxyphenyl)-heptene-2,4,4-dimethyl-2,4-6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, may be used as branching agents in quantities of 0.01 to 1.0 mol. % in relation to the diphenols used. Phenolic branching agents may be added with the diphenols, acid chloride branching agents may be introduced together with the acid chlorides.

The proportion of carbonate structural units in the thermoplastic aromatic polyestercarbonates may be varied at will. The proportion of carbonate groups is preferably up to 100 mol. %, in particular up to 80 mol. %, most preferably up to 50 mol. % in relation to the sum of ester groups and carbonate groups. Both the ester and the carbonate content of the aromatic polyestercarbonates may be present in the form of blocks or distributed at random in the polycondensate.

The thermoplastic, aromatic polycarbonates and polyestercarbonates may be used alone or in any mixture.

Component B

The ABS polymer according to Component B is a rubber-modified graft polymer in which styrene monomers according to B.1.1 and at least one of acrylonitrile and methacrylonitrile (in the following referred to (meth)acrylonitrile) according to B.1.2 are polymerised in the presence of a butadiene rubber B.2, B being produced in the known way by a mass or mass suspension polymerization process, as disclosed e.g. in U.S. Pat. No. 3,243,481, U.S. Pat. No. 3,509,237, U.S. Pat. No. 3,660,535, U.S. Pat. No. 4,221,833 and U.S. Pat. No. 4,239,863.

Examples of B.1.1 styrene monomers are styrene, α-methylstyrene, halogen- or alkyl core-substituted styrenes such as p-methylstyrene, p-chlorostyrene.

Preferred B.1.1 monomers are styrene and α-methyl styrene, preferred B.1.2 monomers is acrylonitrile. Monomers preferred in particular are B.1.1 styrene and B.1.2 acrylonitrile.

B.2 rubbers suitable for the rubber-modified graft polymers B are butadiene rubbers. Butadiene rubbers according to the present invention are those based on butadiene, which may optionally contain up to 50 wt. %, preferably up to 30 wt. %, in particular up to 20 wt. % in relation to the rubber of copolymerisable monomers (e.g. according to B.1.1 and B.1.2), provided that the glass transition temperature of component B.2 is below 10° C., preferably below −10° C., in particular below −20° C. Pure polybutadiene rubber and butadiene/styrene copolymer rubber are preferred in particular.

The content of the grafting base (rubber) in component B is 8 to 15 wt. %, preferably 10 to 15 wt. %, in particular 11 to 14 wt. % in relation to B. If the rubber content is lower, an adequate level of toughness cannot be achieved and if it is higher, melt flowability is inadequate. The content of (meth)acrylonitrile B.1.2 in B is 15 to 30 wt. %, preferably 18 to 27 wt. %, in particular 21 to 26 wt. % in relation to the sum of (meth)acrylonitrile B.1.2 and styrene monomer B.1.1 in the graft polymer B.

Component B may additionally contain small quantities, normally less than 5 wt. %, preferably less than 2 wt. %, in relation to B.2, of ethylenically unsaturated monomers with a crosslinking action. Examples of such monomers with a crosslinking action are alkylene diol-di-(meth)-acrylate, polyester-di-(meth)-acrylate, divinyl benzene, trivinyl benzene, triallyl cyanurate, allyl-(meth)-acrylate, diallyl maleate and diallyl fumarate.

The random copolymer of styrene monomer B.1.1 and (meth)acrylonitrile B.1.2 is normally present in polymer B partially grafted onto or into rubber B.2, this graft mixed polymer forming discrete particles in the random copolymer of B.1.1 and B.1.2. The weight average molecular weight of the free, i.e. elutable random copolymer may be determined by gel permeation chromatography (GPC) and in Components B according to the invention, is $5 \cdot 10^4$ to $14 \cdot 10^4$, preferably $6 \cdot 10^4$ to $13 \cdot 10^4$, in particular $6 \cdot 10^4$ to $11 \cdot 10^4$ g/mol.

The average particle diameter of the resulting grafted rubber particles (determined by counting out from electron-microscopic recordings) is in the range 0.5 to 5 μm, preferably 0.8 to 2.5 μm.

Component C

The optional halogen-free phosphorus compounds suitable in the present context are selected from the group consisting of monomeric and oligomeric phosphoric- or phosphonic acid esters, phosphonate amines and phosphazenes.

Oligomeric phosphoric or phosphonic acid esters of the general formula (IV)

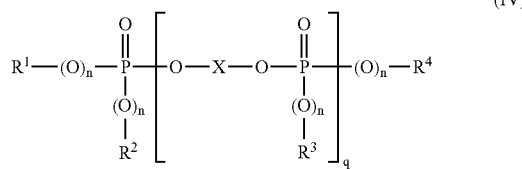

(IV)

are preferred, in which $R^1$, $R^2$, $R^3$ and $R^4$, independently of each other are, in each case, $C_1$–$C_8$-alkyl, $C_5$–$C_6$-cycloalkyl, $C_6$ to $C_{20}$-aryl or $C_7$ to $C_{12}$-aralkyl, where the aromatic or the cycloaliphatic rings may be in each case optionally substituted by alkyl, preferably $C_1$ to $C_4$-alkyl, n independently of each other means 0 or 1 q means 0.5 to 30 and

X means a mono- or polynuclear aromatic group having 6 to 30 C atoms, or a linear or branched aliphatic group having 2 to 30 C atoms, which may be OH substituted and may contain up to 8 ether bonds.

$R^1$, $R^2$, $R^3$ and $R^4$, independently of each other, preferably represent $C_1$ to $C_4$-alkyl, phenyl, naphthyl or phenyl-$C_1$–$C_4$-alkyl. The aromatic groups $R^1$, $R^2$, $R^3$ and $R^4$ may themselves be substituted with alkyl groups, preferably $C_1$ to $C_4$-alkyl. Particularly preferred aryl groups are cresyl, phenyl, xylenyl, propylphenyl or butylphenyl.

X in formula (IV) preferably means a mono- or polynuclear aromatic group having 6 to 30 C atoms. This is preferably derived from diphenols of formula (I).

n in formula (IV) may be, independently of each other, 0 or 1; n preferably equals 1.

q represents values of 0.5 to 30, preferably 0.8 to 15, particularly preferably 1 to 5, in particular 0.8 to 2.

X preferably represents

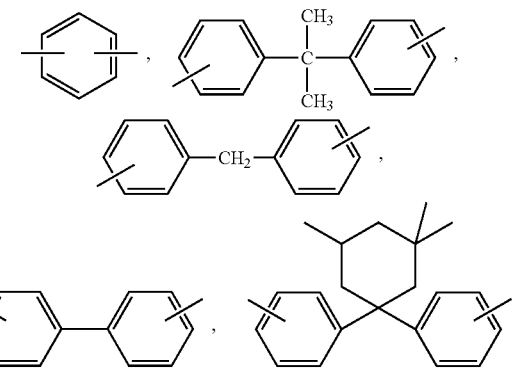

in particular, X is derived from resorcinol, hydroquinone, bisphenol A or diphenylphenol. X is derived particularly preferably from bisphenol A.

Particularly preferred phosphatic compounds are compounds of formula (IVa)

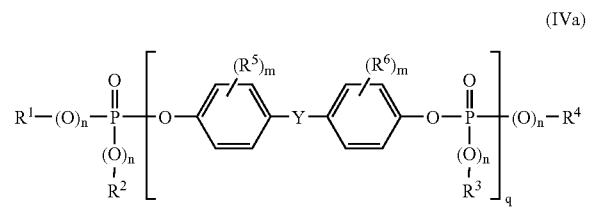

(IVa)

wherein $R^1$, $R^2$, $R^3$, $R^4$, n and q have the meaning given in formula (IV), m independently of each other means 0, 1, 2, 3 or 4

$R^5$ and $R^6$, independently of each other, mean $C_1$ to $C_4$-alkyl, preferably methyl or ethyl and Y means $C_1$ to $C_7$-alkylidene, $C_1$ to $C_7$-alkylene, $C_5$ to $C_{12}$-cycloalkylene, $C_5$ to $C_{12}$-cycloalkylidene, —O—, —S—, —SO$_2$— or —CO—, preferably isopropylidene or methylene.

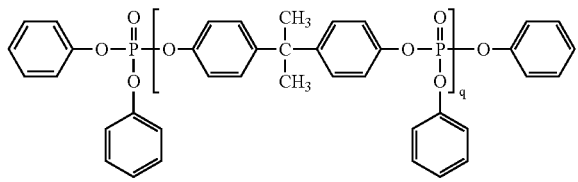

where q=0.8 to 1.5 is preferred in particular.

The phosphorus compounds according to Component C are known (cf. e.g. EP-A 0 363 608, EP-A 0 640 655) or may be produced in the same way by known methods (e.g. Ullmanns Enzyklopadie der technischen Chemie, Vol 18, p. 301 ff. 1979; Houben-Weyl, Methoden der organischen Chemie, Vol. 12/1, p. 43; Beilstein Vol. 6, p. 177).

The average q values may be determined by measuring the composition of the phosphate mixture (molecular weight distribution) by a suitable method (Gas Chromatography (GC), High Pressure Liquid Chromatography (HPLC), Gel Permeation Chromatography (GPC)) and calculating the mean values for q from these.

Component D

The flame retardants according to Component C are often used in combination with so-called anti-dripping agents, which reduce the tendency of the material to burning drip-off in the event of a fire. Examples of these are compounds of the substance classes fluorinated polyolefins, silicons and aramide fibres. These may also be used in the compositions according to the invention. Fluorinated polyolefins are preferred as anti-dripping agents.

Fluorinated polyolefins are known and are disclosed for example in EP-A 0 640 655. They are marketed for example under the trademark Teflon® 30N by DuPont.

The fluorinated polyolefins may be used either in pure form or as a coagulated mixture of emulsions of fluorinated polyolefins with emulsions of vinyl monomer-based graft polymers or (co)polymers, the fluorinated polyolefin being mixed as an emulsion with an emulsion of the graft polymer or copolymer and then coagulated.

Furthermore, the fluorinated polyolefins may be used as a pre-compound with a graft polymer or copolymer, preferably vinyl monomer-based. The fluorinated polyolefins are mixed as a powder with a powder or granulate of the graft polymer or copolymer and compounded in the melt, generally at temperatures of 200 to 330° C. in conventional units such as internal kneaders, extruders or twin shaft screws.

The fluorinated polyolefins may also be used in the form of a master batch, which is produced by emulsion polymerization of at least one monoethylenically unsaturated monomer in the presence of an aqueous dispersion of the fluorinated polyolefin. Preferred monomer components are styrene, acrylonitrile, methylmethacrylate and mixtures thereof. After acid precipitation followed by drying, the polymer is used as a flowable powder.

The coagulates, pre-compounds and master batches generally have fluorinated polyolefin solids contents of 5 to 95 wt. %, preferably 7 to 80 wt. %.

The fluorinated polyolefins are used in concentrations of 0 to 1 parts by weight, preferably 0.1 to 0.5 parts by weight, in particular 0.2 to 0.5 parts by weight, these quantities being in relation to the pure fluorinated polyolefin when using a coagulate, pre-compound or master batch.

Component E

All (co)polymers containing (meth)acrylic acid-$C_1$–$C_8$-alkylesters such as methylmethacrylate, n-butylacrylate, t-butylacrylate, which may optionally contain styrene monomers such as styrene, α-methylstyrene, halogen- or alkyl core substituted styrenes such as p-methylstyrene, p-chlorostyrene and rubbers, may be used as Component E. The proportion of (meth)acrylic acid-$C_1$–$C_8$-alkylesters in Component E is preferably greater than 10 wt. %, preferably greater than 20 wt. %.

The preferred acrylate compound in Component E is methylmethacrylate.

Graft polymers of 10–90 wt. %, preferably 30–80 wt. %, in particular 50–80 wt. % in relation to the graft polymer of a polymer in particle form with a glass transition temperature below 0° C., preferably below −20° C., in particular below −40° C. as a grafting base and 90 to 10 wt. %, preferably 70 to 20 wt. %, in particular 50 to 20 wt. %, in relation to the graft polymer of a grafting shell of vinyl monomers, having a content of at least 40 wt. %, in relation to the grafting shell, preferably at least 60 wt. %, in particular at least 80 wt. % of (meth)acrylic acid-$C_1$–$C_8$-alkylesters such as methylmethacrylate, n-butylacrylate, t-butylacrylate, may be used in particular as Component E. Methylmethacrylate is particularly preferred as the (meth) acrylic acid-$C_1$–$C_8$-alkylester in the grafting shell.

Grafting bases suitable for these graft polymers are, for example, diene rubbers, EP(D)M rubbers, in other words, those based on ethylene/propylene and optionally diene compounds, also acrylate-, polyurethane-, silicon-, chloroprene- and ethylene/vinylacetate rubbers and silicon-acrylate composite rubbers.

Diene rubbers, silicon rubbers and silicon-acrylate composite rubbers are preferred. Silicon-acrylate composite rubbers are preferred in particular.

Diene rubbers according to the present invention are e.g. those based, for example, on butadiene or isoprene or copolymers of these with other copolymerisable monomers. Preferred copolymerisable monomers are vinyl monomers selected from the group of vinyl aromatics, core-substituted vinyl aromatics (such as for example styrene, α-methylstyrene, p-methylstyrene), methacrylic acid-($C_1$–$C_8$)-alkylesters (such as methylmethacrylate, ethylmethacrylate), acrylic acid-($C_1$–$C_8$)-alkylesters (such as n-butyl acrylate and tert.-butyl acrylate or mixtures of these), vinyl cyanides (unsaturated nitriles such as acrylonitrile and methacrylonitrile) and derivatives of unsaturated carboxylic acids such as anhydrides and imides (for example maleic acid anhydride and N-phenyl maleic imide), styrene at a preferred content of up to 30 wt. % in relation to the diene rubber being preferred in particular.

Pure polybutadiene rubber is preferred in particular.

These grafting bases generally have an average particle size ($d_{50}$ value) of 0.05 to 5 μm, preferably 0.1 to 2 μm, in particular 0.1 to 1 μm.

The average particle size $d_{50}$ is the diameter above and below which 50 wt. % of the particles in each case lie. It may be determined by ultracentrifugal measurement (W. Scholtan, H. Lange, Kolloid, Z. and Z. Polymere 250 (1972), 782–1796).

The gel content of these grafting bases is at least 30 wt. %, preferably at least 40 wt. % (measured in toluene).

The gel content is measured at 25° C. in a suitable solvent (M. Hoffmann, H. Krömer, R. Kuhn, Polymeranalytik I and II, Georg Thieme-Verlag, Stuttgart 1977).

Acrylate rubbers, silicon rubbers or silicon-acrylate composite rubbers that contain 0 to 100 wt. %, preferably 1 to 99 wt. %, in particular 10 to 99 wt. %, particularly preferably 30 to 99 wt. % polyorganosiloxane component and 100 to 0 wt. %, preferably 99 to 1 wt. %, in particular 90 to 1 wt. %, particularly preferably 70 to 1 wt. % polyalkyl(meth)acrylate rubber component (the total quantity of the respective rubber components equalling 100 wt. %) are particularly preferred as grafting bases.

Such rubbers preferably have an average particle diameter of 0.01 to 0.6 μm.

Preferred silicon-acrylate rubbers used are those for which the production process is disclosed in JP 08 259 791-A, JP 07 316 409-A and EP-A 0 315 035. The contents of these applications in this respect are hereby adopted in this application.

The polyorganosiloxane component in the silicon-acrylate composite rubber may be produced by reacting an organosiloxane with a multifunctional crosslinker in an emulsion polymerization process. Furthermore, it is possible, by adding suitable unsaturated organosiloxanes, to insert graft-active sites into the rubber.

The organosiloxane is generally cyclic, the ring structures preferably containing 3 to 6 Si atoms. Examples of these are hexamethylcyclotrisiloxane, octamethylcyclotetrasiloxane, decamethylcyclopentasiloxane, dodecamethylcyclo-hexasiloxane, trimethyltriphenylcyclotrisiloxane, tetramethyltetraphenylcyclotetra-siloxane, octaphenylcyclotetrasiloxane, which may be used alone or in a mixture of two or more compounds. The organosiloxane component should account for at least 50 wt. %, preferably at least 70 wt. %, in relation to the silicon content in the silicon-acrylate rubber, of the structure of the silicon content of the silicon acrylate-rubber.

3- or 4-functional silane compounds are generally used as crosslinkers. Particularly preferred examples of these are: trimethoxymethylsilane, triethoxyphenylsilane, tetramethoxysilane, tetraethoxysilane, tetra-n-propoxy-silane, tetrabutoxysilane. 4-functional branching agents, in particular tetraethoxysilane. The quantity of branching agent is generally 0 to 30 wt. % (in relation to the polyorganosiloxane component of the silicon-acrylate rubber).

For the incorporation of graft-active sites in the polyorganosiloxane component of the silicon-acrylate rubber, compounds having one of the following structures are preferably used:

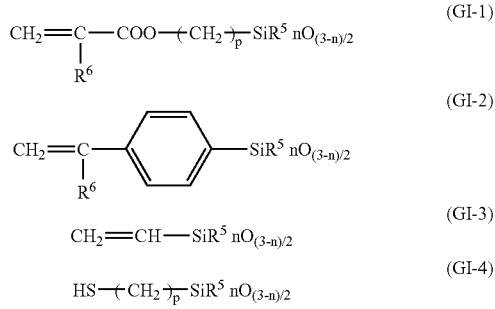

wherein
$R^5$ means methyl, ethyl, propyl or phenyl,
$R^6$ means hydrogen or methyl,
n means 0, 1 or 2 and
p means a number from 1 to 6.

(Meth)acryloyloxysilane is a preferred compound for the formation of the structure (GI 1). Preferred (meth)acryloyloxysilanes are, for example, β-methacryloyloxy-ethyl-dimethoxy-methyl-silane, γ-methacryloyl-oxy-propyl-methoxy-dimethyl-silane, γ-methacryloyloxypropyl-dimethoxy-methyl-silane, γ-methacryloyloxypropyl-trimethoxy-silane, γ-methacryloyl-propyl-ethoxy-diethyl-silane, γ-methacryloyloxypropyl-diethoxy-methyl-silane, γ-methacryloyloxy-butyl-diethoxy-methyl-silane.

Vinyl siloxanes, in particular tetramethyl-tetravinyl-cyclotetrasiloxane, are capable of forming the structure GI-2.

p-vinylphenyl-dimethoxy-methylsilane, for example, may form structure GI-3. γ-mercaptopropyldimethoxy-methylsilane, γ-mercaptopropylmethoxy-dimethylsilane, γ-mercaptopropyldiethoxymethylsilane etc may form the structure (GI-4).

The quantity of these compounds is 0 to 10, preferably 0.5 to 5 wt. % (in relation to the polyorganosiloxane component).

The acrylate component in the silicon-acrylate composite rubber may be produced from alkyl (meth)acrylates, crosslinkers and graft-active monomer units.

Examples of preferred alkyl (meth)acrylates are alkyl acrylates such as methylacrylate, ethylacrylate, n-propylacrylate, n-butylacrylate, 2-ethylhexyl acrylate and alkylmethacrylates such as hexyl methacrylate, 2-ethylhexyl methacrylate, n-lauryl methacrylate and, in particular, n-butylacrylate.

Multifunctional compounds are used as crosslinkers. Examples of these are: ethylene glycol dimethacrylate, propylene glycol dimethacrylate, 1,3-butylene glycol dimethacrylate and 1,4-butylene glycol dimethacrylate.

The following compounds are, for example, used, alone or in mixture, for the insertion of graft-active sites: allyl methacrylate, triallyl cyanurate, triallyl isocyanurate, allyl methacrylate. Allyl methacrylate may also function as a crosslinker. These compounds are used in quantities of 0.1 to 20 wt. %, in relation to the acrylate rubber component in the silicon-acrylate composite rubber.

Methods for producing the silicon-acrylate composite rubbers preferably used in the compositions according to the invention and for grafting these with monomers are disclosed, for example, in U.S. Pat. No. 4,888,388, JP 08 259 791 A2, JP 07 316 409A and EP-A 0 315 035. Silicon-acrylate composite rubbers in which the silicon and acrylate components form a core-shell structure and those that form a network in which the acrylate and silicon components completely interpenetrate each other (interpenetrating network) are possible grafting bases for the graft polymer.

Graft polymerization on the grafting bases described above may be carried out in suspension, dispersion or emulsion. Continuous or discontinuous emulsion polymerization is preferred. This graft polymerization is carried out with radical initiators (e.g. peroxides, azo compounds, hydroperoxides, persulfates, perphosphates) and optionally using anionic emulsifiers, e.g. carboxonium salts, sulfonic acid salts or organic sulfates. This forms graft polymers with high grafting yields, i.e. a large proportion of the polymer of the graft monomers is chemically bonded to the rubber. Graft polymers according to Component E, produced by emulsion polymerization, are particularly preferred).

Component F

The very fine-particle inorganic powders F used according to the invention, preferably consist of at least one polar compound of one or more metals of the $1^{st}$ to $5^{th}$ main group or the $1^{st}$ to $8^{th}$ sub-group of the periodic system, preferably the $2^{nd}$ to $5^{th}$ main group or the $4^{th}$ to $8^{th}$ sub-group, in particular the $3^{rd}$ to $5^{th}$ main group or $4^{th}$ to $8^{th}$ sub-group, or of compounds of these metals with at least one element selected from oxygen, hydrogen, sulfur, phosphorus, boron, carbon, nitrogen or silicon.

Preferred compounds are, for example, oxides, hydroxides, hydrous oxides, sulfates, sulfites, sulfides, carbonates, carbides, nitrates, nitrites, nitrides, borates, silicates, phosphates, hydrides, phosphites or phosphonates.

The very fine-particle inorganic powders preferably consist of oxides, phosphates, hydroxides, preferably of $TiO_2$, $SiO_2$, $SnO_2$, ZnO, ZnS, Boehmite, $ZrO_2$, $Al_2O_3$, aluminium phosphates, iron oxides, also TiN, WC, AlO(OH), $Sb_2O_3$, iron oxides, $NaSO_4$, vanadium oxides, zinc borate, silicates such as Al-silicates, Mg-silicates, one- two- and three-dimensional silicates. Mixtures and doped compounds may also be used.

Furthermore, these nanoscale particles may be surface-modified with organic molecules, to achieve better compatibility with the polymers. In this way, hydrophobic or hydrophilic surfaces may be produced.

Hydrate-containing aluminium oxides, such as Boehmite, talc or $TiO_2$ are particularly preferred.

The maximum average particle diameters of the fine-particle inorganic materials are less than or equal to 1000 nm, preferably less than or equal to 500 nm, in particular less than or equal to 200 nm.

The inorganic compounds may be present as powders, pastes, sols, dispersions or suspensions. Powders may be obtained by precipitation from the dispersions, sols or suspensions.

Component G

The compositions according to the invention may further contain up to 10 parts by weight, preferably up to 5 parts by weight, in particular up to 2 parts by weight of at least one conventional additive known in the art for its utility in relevant thermoplastic molding compositions, such as mold lubricant and mold release agent, for example pentaerythritol tetrastearate, nucleation agent, antistatic, stabilizer, light-protection agent, hydrolysis stabilizer, filler or reinforcing agent, dye or pigment as well as a further flame retardant or a flame-retarding synergist.

In this application the sum of the parts by weight of all components in the composition is equal to 100.

The compositions according to the invention are produced by mixing the respective components in the known way and melt compounding and melt extruding them at temperatures of 200° C. to 300° C. in conventional units such as internal kneaders, extruders and twin-shaft screws.

The individual components may be mixed in the known way either successively or simultaneously, and either at about 20° C. (room temperature) or at a higher temperature.

The invention therefore also provides a process for the production of the compositions.

The compositions according to the invention may be used to produce molded parts of any kind. These may be produced, for example, by injection molding, extrusion and blow-molding processes. A further form of processing is the production of molded bodies by deep-drawing from previously produced sheets or films. The invention therefore also provides the molded parts that may be obtained from the composition according to the invention.

Examples of such molded parts are films, profiles, housing parts of all kinds e.g. for domestic appliances such as juicers, coffee machines, food mixers; for office equipment such as monitors, printers, copiers, Notebooks and mobile phones; also sheets, tubes, ducting for electrical installations, profiles for the building industry, internal fittings and external applications; parts for the electrotechnical sector such as switches and plugs and internal and external automobile components.

The compositions according to the invention may be used in particular, for example, for the production of the following molded parts:

Internal components for rail vehicles, ships, aircraft, buses and cars, hub caps, casings for electrical equipment containing-small transformers, casings for equipment used for the dissemination and transmission of information, cases and linings for medical applications, massage devices and casings for them, children's toy vehicles, wall elements in sheet form, cases for safety equipment, rear spoilers, bodywork parts and internal components for motor vehicles, heat-insulated transport containers, devices for holding and caring for small animals, molded parts for sanitary and bathroom fittings, covering grilles for air vents, molded parts for garden sheds and tool sheds, cases for garden tools.

The following examples explain the invention in more detail.

EXAMPLES

Component A1

Linear polycarbonate based on bisphenol A, with a weight average molecular weight ($M_w$) of 26,000 g/mol (measured by GPC).

Component A2

Linear polycarbonate based on bisphenol A with a weight average molecular weight ($M_w$) of 27,000 g/mol (measured by GPC).

Component B1

ABS graft polymer produced by mass polymerization with an A/B/S weight ratio of 20%/13%/67% containing SAN with a weight average molecular weight ($M_w$) of 80,000 g/mol (measured by GPC).

Component B2

ABS graft polymer produced by mass polymerization with an A/B/S weight ratio of 20%/15%/65% containing SAN with a weight average molecular weight ($M_w$) of 170,000 g/mol (measured by GPC).

Component C

Bisphenol A-bridged oligophosphate (BDP)

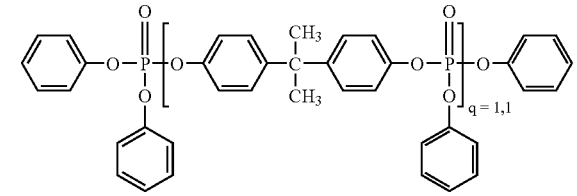

Component D

Blendex 449: PTFE preparation from General Electric Plastics consisting of 50 wt. % PTFE and 50 wt. % SAN copolymer.

Component E

Paraloid® EXL2600: MBS (Methyl(meth)acrylate-grafted butadiene-styrene rubber with a glass transition temperature of −80° C. from Rohm & Haas, Antwerp, Belgium)

Component F
  Pural® 200: nanoscale basic aluminium oxide from Condea (Hamburg, Germany)
Component G
  Additive: G1: pentaerythritol tetrastearate (PETS)
  G2: phosphite stabilizer Production and Testing of the Molding Compositions According to the Invention The components are mixed in a twin-screw extruder (ZSK25) from Werner und Pfleiderer, at a mass temperature of 240° C. The molded bodies are produced at the same melt temperature and a mold temperature of 80° C. in an Arburg 270 E injection molding machine.

The notched impact resistance $a_k$ is measured to ISO 180/1 A.

The combustion behavior of the samples is measured to UL-Subj. 94V on bars measuring 127×12.7×1.5 mm.

The melt viscosity is measured at 260° C. and a shear rate of 1000 s$^{-1}$ to DIN 54811.

The stress cracking behavior under the influence of chemicals (ESC behavior) is tested on bars measuring 80 mm×10 mm×4 mm. A mixture of 60 vol. % toluene and 40 vol. % isopropanol is used as the test medium. The test specimens are pre-strained using an arc-shaped jig (boundary fibre strain $\epsilon_x$ is 3.2%) and stored at 23° C. in the test medium. The time to break is measured under these conditions.

The creep behavior (creep resistance) is measured in a tensile test on shoulder bars measuring 70 mm×40 mm×10 mm. The bars are subjected to a constant tension of 50 MPa at 23° C. and the strain as a function of the time to break is detected. The time to break is a measure of the creep resistance under these conditions.

Hydrolysis resistance is determined by means of the increase in the melt volume rate (MVR) measured at 240° C. with a die load of 5 kg to ISO 1133 during storage of granulate of the compound for 100 h at 80° C. and a relative atmospheric humidity of 100%. As hydrolytic degradation of the polycarbonate in the composition leads to an increase in the MVR, it is desirable to minimise the increase in MVR.

A summary of the characteristics of the molding compositions according to the invention is given in Table 1.

The data show that using mass-ABS type 1 as opposed to the same composition with mass ABS type 2 results in clear improvements in melt flowability, creep resistance and resistance to stress cracking as under the influence of chemicals with equally good toughness and flame-resistance (cf. example 1 and reference example 1). Even when using a slightly higher-molecular polycarbonate advantages in melt flowability are still achieved with further improvements in creep resistance and resistance to stress cracking in comparison with the reference example (see example 3).

Adding nanoscale compounds increases the flowability of the composition and, in particular, improves its resistance to hydrolysis (cf. examples 1 and 2). Adding acrylate-containing graft polymers produces a considerable increase in notched impact resistance. If this is restricted to small concentrations, the other characteristics are impaired only slightly, so that the properties of the corresponding reference example A are still exceeded (cf. examples 1, 4, 5 and 6).

In particular, the addition of the acrylate-containing graft polymers does not have the detrimental effect on resistance to hydrolysis that is generally observed when adding the emulsion ABS polymers used in the prior art to increase notched impact resistance.

TABLE 1

Moldingcompositions and their characteristics

| | | A* | 1 | 2 | 3 | 4 | 5 | 6 |
|---|---|---|---|---|---|---|---|---|
| Components [parts by weight] | | | | | | | | |
| A1 | PC1 | 68.9 | 68.9 | 69.5 | — | 68.9 | 68.9 | 68.9 |
| A2 | PC2 | — | — | — | 68.9 | — | — | — |
| B1 | Mass ABS 1 | — | 16.4 | 16.6 | 16.4 | 15.9 | 15.4 | 14.4 |
| B2 | Mass ABS 2 | 16.4 | — | — | — | — | — | — |
| C | BDP | 12.5 | 12.5 | 12.6 | 12.5 | 12.5 | 12.5 | 12.5 |
| D | PTFE-SAN master batch | 0.8 | 0.8 | 0.8 | 0.8 | 0.8 | 0.8 | 0.8 |
| E | MBS | — | — | — | — | 0.5 | 1.0 | 2.0 |
| F | Nanoscale inorgan. material | 0.9 | 0.9 | — | 0.9 | 0.9 | 0.9 | 0.9 |
| G1 | PETS | 0.4 | 0.4 | 0.4 | 0.4 | 0.4 | 0.4 | 0.4 |
| G2 | Phosphite stabilizer | 0.1 | 0.1 | 0.1 | 0.1 | 0.1 | 0.1 | 0.1 |
| Characteristics | | | | | | | | |
| Creep resistance - time to creep failure [h] | | 8 | 13 | 15 | 15 | n.m | n.m | n.m |
| Stress cracking resistance - time to break [min] | | 3 | 11 | 10 | 25 | 9 | 8 | 6 |
| Hydrolysis resistance - MVR increase [%] | | n.m | 17 | 47 | 19 | n.m | n.m | 19 |
| $a_k$ [kJ/m$^2$] | | 11 | 12 | 13 | 14 | 14 | 15 | 32 |
| UL94 V-score | | V-0 | V-0 | V-0 | V-0 | V-0 | V-0 | V-0 |
| Melt viscosity [Pas] | | 164 | 135 | 144 | 152 | 141 | 147 | 152 |

*Reference example
n.m = not measured

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:
1. A thermoplastic molding composition comprising
  A) 50 to 80 parts by weight of at least one member having weight average molecular weight of 25,000 to 35,000 g/mol, selected from the group consisting of aromatic polycarbonate and polyestercarbonate, B) 7 to 30 parts by weight of ABS graft polymer produced by the mass polymerization process from at least one of acrylonitrile and methacrylonitrile, further butadiene and at least one styrene monomer, said graft polymer (i) having a butadiene content of 11 to 14 % in relation to the weight of the graft polymer, and (ii) having a (meth)acrylonitrile content of 15 to 30 % in relation to the total weight of the (meth)acrylonitrile and styrene monomer in said graft polymer, and (iii) containing styrene monomer-(meth)acrylontrile copolymer having a weight average molecular weight of $5 \cdot 10^4$ to $14 \cdot 10^4$ g/mol.

C) 2 to 18 parts by weight of a halogen-free phosphorus compound,

D) 0 to 1 parts by weight fluorinated polyolefin,

E) 0 to 5 parts by weight of a polymer containing acrylate monomer and

F) 0 to 3 parts by weight of an inorganic material in particulate form with an average maximum particle diameter of no more than 1000 nm, said parts by weight totaling 100.

2. The composition according to claim 1, wherein said A has a weight average molecular weight of 26,000 to 31,000 g/mol.

3. The composition according to claim 1, in which Component B) is produced from acrylonitrile, butadiene and styrene.

4. The composition according to claim 1, in which Component B) contains styrene-acrylic-(meth)acrylonitrile copolymer having weight average molecular weight of $6 \cdot 10^4$, to $11 \cdot 10^4$ g/mol.

5. The composition according to claim 1, in which Component B) contains 21 to 26 wt.% (meth)acrylonitrile in relation to the total weight of the (meth)acrylonitrile and styrene monomers.

6. The composition according to claim 1 wherein said A) is present in an amount of 60 to 80 parts by weight.

7. The composition according to claim 6 wherein said B) is present in an amount of 10 to 20 parts by weight.

8. The composition according to claim 1 wherein said C) is present in an amount of 8 to 16 parts by weight.

9. The composition according to claim 1 wherein said D) is present in an amount of 0.2 to 0.5 parts by weight.

10. The composition according to claim 1 wherein said E) is present in an amount of 0.5 to 2 parts by weight.

11. The composition according to claim 1 wherein said F) is present in an amount of 0.2 to 1.5 parts by weight.

12. The composition according to claim 1 further containing at least one additive selected from the group consisting of mold lubricants, mold release agents, nucleation agents, antistatics, stabilizers, UV-protectors, hydrolysis stabilizers, fillers, reinforcing agents, flame-retardants, flame retarding synergists, dyes and pigments.

13. The composition according to claim 1 wherein C) conforms to the general formula

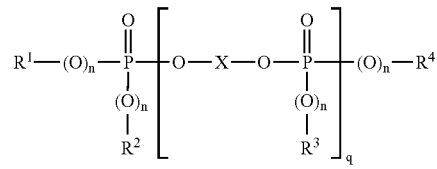

in which $R^1$, $R^2$, $R^3$ and $R^4$, independently of each other denote $C_1$ to $C_8$-alkyl, $C_5$ to $C_6$-cycloalkyl $C_6$ to $C_{20}$-aryl or $C_7$ to $C_{12}$-aralkyl, n independently of each other denote 0 or 1, q is 0 to 30 and X denotes a mono- or polynuclear aromatic group having 6 to 30 C atoms or a linear or branched aliphatic group having 2 to 30 C atoms.

14. The composition according to claim 13, wherein X represents a member selected from the group consisting of

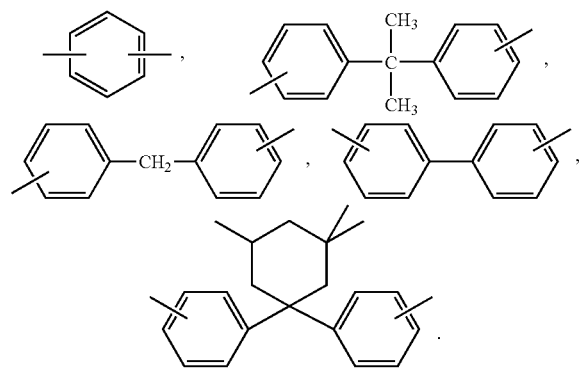

15. The composition according to claim 1, in which D) is in the form of a master batch, a pre-compound or a co-precipitation of polytetrafluoroethylene and a vinyl monomer-containing polymer.

16. The composition according to claim 1, in which E) is a graft polymer of 10 to 90 wt. % of a mixture of 0 to 60 wt. % of at least one vinyl aromatic and 40 to 100 wt. % of at least one member selected from the group consisting of methacrylic acid-$(C_1-C_8)$-alkyl ester and acrylic acid-$(C_1-C_8)$-alkyl ester on 90 to 10 wt. % of one or more rubbers with glass transition temperature of <0° C.

17. The composition according to claim 16, in which the rubber is selected from the group consisting of polybutadiene rubbers, silicon rubbers and silicon-acrylate composite rubbers.

18. The composition according to claim 1, in which F) has an average maximum particle diameter of no more than 200 nm.

19. The composition according to claim 1, characterized in the absence of ABS produced by the emulsion-polymerization process therefrom.

20. A molded article comprising the composition according to claim 1.

* * * * *